United States Patent [19]

Tanaka et al.

[11] 4,404,049
[45] Sep. 13, 1983

[54] HARD FACING NICKEL-BASE ALLOY

[75] Inventors: Kanichi Tanaka, Yawata; Kensuke Hidaka, Kyoto, both of Japan

[73] Assignee: Fukuda Metal Foil & Powder Co., Ltd., Kyoto, Japan

[21] Appl. No.: 189,843

[22] PCT Filed: Feb. 5, 1979

[86] PCT No.: PCT/JP79/00026
    § 371 Date: Oct. 24, 1979
    § 102(e) Date: Oct. 24, 1979

[87] PCT Pub. No.: WO79/00772
    PCT Pub. Date: Oct. 4, 1979

[30] Foreign Application Priority Data

Mar. 16, 1978 [JP] Japan ................................. 53-30709
Aug. 24, 1978 [JP] Japan ................................ 53-103402

[51] Int. Cl.³ .............................................. C22C 19/05
[52] U.S. Cl. .................................... 148/427; 148/442
[58] Field of Search ............. 75/171, 170, 122, 134 F; 148/32, 32.5

[56] References Cited

U.S. PATENT DOCUMENTS 2,755,183 7/1956 Cape ....................................... 75/171
2,864,696 12/1958 Foreman ................................ 75/171
2,899,302 8/1959 Cape et al. ............................ 75/171
3,428,442 2/1969 Yurasko, Jr. ....................... 29/191.2
4,188,209 2/1980 Kruske ................................... 75/171

FOREIGN PATENT DOCUMENTS 2418607 10/1975 Fed. Rep. of Germany .
47-1685 1/1972 Japan .
1041930 9/1966 United Kingdom .
1205793 9/1970 United Kingdom .

Primary Examiner—R. Dean
Attorney, Agent, or Firm—Fidelman, Wolffe & Waldron

[57] ABSTRACT

Hard facing nickel-base alloys comprising 0.05 to 1.5% by weight of boron, 3 to 7% by weight of silicon, 7.5 to 35% by weight of chromium, 0.05 to 1.5% by weight of carbon, and if necessary, less than 30% by weight of iron and/or less than 5% by weight of tungsten, the balance being nickel, with the weight ratio of silicon to boron being equivalent to or exceeding 3.3. The alloys have a high degree of toughness, ductility, wear resistance and corrosion resistance, and no cracks occur in the hard facing layer. Addition of 0.1 to 3% by weight of the tin and/or 0.1 to 3% by weight of tantalum remarkably increases the corrosion resistance. The alloys can be used as a hard facing material to be applied to parts of various instruments, machines and plants.

7 Claims, 3 Drawing Figures

HARD FACING NICKEL-BASE ALLOY

TECHNICAL FIELD

This invention relates to nickel-base alloy for hard facing, and more particularly to a hard facing nickel-base alloy which has high toughness, high wear resistance and high corrosion resistance and which is used for hard facing of various kinds of structures, machine parts, instruments, etc.

BACKGROUND ART

Among various methods of hard facing various kinds of structures, machine parts, instruments, etc. for prevention of wear, corrosion, high temperature oxidation, errosion etc., there is known a method of hard facing through use of what is called the self-fluxing alloy by means of spraying or build up welding.

Self-fluxing alloys comprise a base of nickel (Ni), nickel-chromium (Ni-Cr) or cobalt-chromium (Co-Cr) and additives of boron (B) and silicon (Si). Among such self-fluxing alloys nickel-base alloys containing 1 to 3% by weight of boron and 2.3 to 5% by weight of silicon are widely used because of their relatively good wear resistance, corrosion resistance and workability for hard facing.

However, the above-mentioned conventional self-fluxing nickel-base alloys have a disadvantage that when they have been applied onto a large piece of base metal or a base of a metal which has a thermal expansion coefficient greatly different from those of the alloys, craks or fissures will occur in the hard facing alloy layer under certain conditions of employment.

This disadvantage is caused by the presence of a quasi-binary eutectic structure of a Ni-solid solution+-Ni$_3$B in the structure constituting the matrix of the conventional self-fluxing nickel-base alloys.

Since the Ni$_3$B in the quasi-binary eutectic structure of Ni-solid solution+Ni$_3$B is so brittle that this binary eutectic structure is the least tough and ductile in the matrix, cracks or fissures occur in the hard facing layer of the alloy under certain conditions of employment as mentioned above.

Moreover, although the above-mentioned self-fluxing nickel-base alloys have relatively high wear resistance and corrosion resistance, these characteristics have been found not sufficiently satisfactory under certain conditions of employment with much room left for improvement.

Besides the self-fluxing nickel-base alloys there are known cobalt-base alloys available for hard facing. These alloys are composed of 0.9 to 1.6% by weight of carbon, less than 0.5% by weight of manganese, 0.8 to 1.5% by weight of silicon, 26 to 29% by weight of chromium, 4 to 6% by weight of tungsten, and less than 3% by weight of iron, the balance being cobalt. The alloys have a hardness of 35 to 45 in Rockwell C scale and a Charpy impact value of 0.9 to 1.4 kgm/cm$^2$. Even under such conditions as would cause cracks or fissures in the hard facing layer of the conventional self-fluxing nickel-base alloys, the cobalt-base alloys are less susceptible to cracks or fissures and have relatively high wear resistance.

However, when the cobalt-base alloys are used at the places such as nuclear plants, where they are exposed to radioactivity, Co$^{60}$ that is an isotope having a long half-life is produced with a resulting danger of environmental pollution. Therefore, it is undesirable to use a cobalt-base alloy for hard facing of the seat of a valve used in, e.g., an atomic power plant, and there has been a demand for hard facing alloys which can replace the cobalt-base alloys.

In an effort to solve the above technical problems, the present inventors have studied the compositions of self-fluxing nickel-base alloys and conducted various experiments, with the following three conditions having been set as the basic conditions the alloys of this invention are to satisfy:

(1) To have a hardness (Rockwell C scale) of more than 35.

(2) To have an impact value (Charpy impact) of more than 0.9 kgm/cm$^2$.

(3) That the value of the hardness multiplied by the impact values should exceed 45. (This value will be referred to as the HI value hereinafter).

The hard facing nickel-base alloys which satisfy the above conditions sufficiently satisfy the usual conditions under which the cobalt-base alloys are actually used in various applications.

One object of this invention is to provide hard facing nickel-base alloys which satisfy the above three conditions and which are tough and ductile and superior in both wear resistance and corrosion resistance and have good workability for hard facing, and in which craks or fissures are unlikely to occur in the hard facing layer.

Another object of this invention is to further increase the corrosion resistance of such nickel-base hard facing alloys as above-mentioned.

DISCLOSURE OF THE INVENTION

The above-mentioned objects of the invention are attained by the alloys having the following compositions (1) to (7) in accordance with the invention:

(1) A hard facing nickel-base alloy consisting of 0.05 to 1.5% by weight of boron, 3 to 7% by weight of silicon, 7.5 to 35% by weight of chromium and 0.05 to 1.5% by weight of carbon, the balance being substantially nickel, and the weight ratio of silicon to bron (Si/B) being more than 3.3.

(2) The hard facing nickel-base alloy described in the above (1) further containing less than 30% by weight of iron.

(3) The hard facing nickel-base alloy described in the above (1) further containing less than 5% by weight of tungsten.

(4) The hard facing nickel-base alloy described in the above (1) further containing less than 30% by weight of iron and less than 5% by weight of tungsten.

(5) The hard facing nickel-base alloy described in either of the above (1), (2), (3) and (4) further containing 0.1 to 3% by weight of tin.

(6) The hard facing nickel-base alloy described in either of the above (1), (2), (3) and (4) further containing 0.1 to 3% by weight of tantalum.

(7) The hard facing nickel-base alloy described in either of the above (1), (2), (3) and (4) further containing 0.1 to 3% by weight of tin and 0.1 to 3% by weight of tantalum.

The reasons why the compositions of these alloys and the amounts of the components have been determined as above given are as follows:

(a) Boron (B) and silicon (Si).

Both boron and silicon affect the hardness and the impact value of the alloy and also have a function to improve the workability thereof in hard facing. With less than 0.05% by weight of boron, or less than 3% by weight of silicon, the hardness in Rockwell C becomes less than 35 with resulting reduction of the wear resistance and deterioration of the workability due to much slag which is not self-fluxing being produced upon application of the alloy for hard facing. Therefore, boron or silicon contents less than the above percentages are not preferred. With more than 1.5% by weight of boron, or more than 7% by weight of silicon, the impact value becomes less than 0.9 kgm/cm$^2$ and the HI value becomes less than 45 with possible occurrence of cracks or fissures in the hard facing layer. Therefore, boron or silicon contents more than these percentages are not preferred.

(b) The weight ratio of silicon to boron (Si/B).

In the known self-fluxing nickel-base alloys containing boron and silicon the weight ratio of silicon to boron (Si/B) is less than 3. As a result of various studies and experiments the present inventors have found that if this ratio is less than 3, the alloy is not sufficiently tough and ductile, and that when the alloy is applied as a hard facing layer to a large-sized object of the base metal or an object which has a thermal expansion coefficient different from that of the alloy, cracks and fissures are produced in the hard facing layer, and from the following considerations it has been found that by rendering the ratio Si/B more than 3.3 it is possible to increase the toughness and ductility of the alloys and completely eliminate the above-mentioned defects.

The conventional self-fluxing nickel-base alloys consist of 1 to 3% by weight of boron, 2.3 to 5% by weight of silicon, 0 to 17% by weight of chromium, 0.1 to 1% by weight of carbon, 0 to 5% by weight of iron and, if necessary, up to 5% by weight of one or more of copper, molybdenum and tungsten, the balance being substantially nickel. A metallographical analysis of the alloy system is as follows:

(i) The matrix is composed chiefly of three elements, that is, nickel, boron and silicon. Since the nickel here is a solid solution containing silicon, a small amount of boron, and chromium, iron, copper, molybdenum, tungsten, etc. to be described hereinafter, this nickel solid solution will be referred to as (Ni) in order to distinguish it from pure nickel.

(ii) A portion of the added chromium is dissolved in (Ni) in the solid state so as to enter the matrix, and the remainder of the chromium is combined with the carbon added simultaneously to form chromium carbide, chiefly complex chromium carbide $M_7C_3$ type wherein M represents chiefly chromium with small amounts of molybdenum, tungsten, nickel, iron, etc. and also with a portion of the boron to form chromium boride, chiefly complex chromium boride MB type wherein M is the same as the above. The partition coefficient of the chromium, that is, what parts of the chromium are distributed to the matrix and $M_7C_3$, and the partition coefficient of the boron, that is, what parts thereof are distributed to the matrix and MB are not certain.

(iii) Since solidification of the $M_7C_3$ and MB phases from the liquid alloy occurs at sufficiently higher temperatures (1270° C. to 1420° C.) than the temperature range in which the matrix components solidify (960° C. to 1200° C. and 960° C. to 1080° C. for most of the matrix components), the $M_7C_3$ and MB crystallize as the primary and secondary phases so as to be dispersed in the matrix before the solidifying temperatures of the matrix components are reached. Since the $M_7C_3$ and MB are both hard, they will be called the hard crystals.

(iv) The iron and copper are dissolved chiefly in the (Ni) in the matrix, and the molybdenum and tungsten chiefly in the $M_7C_3$ or MB.

(v) As described above, the conventional self-fluxing nickel-base alloys of the above-mentioned compositions have a microstructure comprising either (a) a matrix composed of the three elements, (Ni), boron and silicon, or (b) a matrix composed of the same three elements as in the above (a) with the hard crystals, chiefly $M_7C_3$ and a small amount of MB being dispersed therein under the coexistence of a large amount of chromium and carbon.

In an effort to improve the toughness and ductility of the self-fluxing nickel-base alloys of the above microstructures the present inventors have conducted metallographical studies and found out that the toughness and ductility of an alloy is essentially determined by the toughness and ductility of the matrix of the alloy and that although the presence of hard crystals may more or less deteriorate the toughness and ductility, it does not materially affect these properties.

Therefore, in order to improve the toughness and ductility of the conventional self-fluxing nickel-base alloys it is necessary to improve the structure of their matrix.

From this viewpoint the alloy whose matrix is composed of the three elements, (NI)-B-Si, will first be studied. Referring to FIG. 1 which shows the liquidus surface of the (Ni)-B-Si ternary alloy, as boron and silicon are added to nickel, the liquidus temperature of the nickel solid solution decreases so that the primary crystallization surface thereof borders the primary crystallization surface of $Ni_3B$ at the Ni-B side and the $Ni_3Si$ primary crystallization surface at the Ni-Si side, with quasi-binary eutectic reaction lines intervening therebetween respectively.

From the binary eutectic point X(1093° C.) at which the boron content is 3.9% by weight the quasi-binary eutectic reaction line $L=(Ni)+Ni_3B$ extends in the direction in which the boron content decreases and the silicon content increases as the temperature lowers as far as to cross the quasi-binary eutectic reaction line $L=(Ni)+Ni_3Si$ which extends from the binary eutectic point Z (1152° C.) where the silicon content is 11.5% by weight in the direction in which the boron content increases and the silicon content decreases as the temperature lowers, at the ternary eutectic point Y where the boron content is 2.2% by weight and the silicon content is 7.2% by weight.

The boron and silicon contents in the conventional self-fluxing nickel-base alloys are within the hatched area P in FIG. 2. Therefore, in the matrix of these conventional alloys the melt whose composition is at the point a (2% by weight of boron and 2.3% by weight of silicon) reaches the liquidus surface as the temperature lowers, whereupon (Ni) is crystallized as the temperature further lowers so that the composition of the melt changes along the dotted line from the point a to the point b, with the liquidus temperature thereof lowering. When the point b is reached, the composition of the melt changes from the point b to the point Y along the eutectic reaction line $L=(Ni)+Ni_3B$ as the temperature lowers, with the binary eutectic of $(Ni)+Ni_3B$ being crystallized and the temperature of the liquid phase lowering until the point Y is reached, whereupon the ternary eutectic of (Ni)+Ni₃B+Ni₃Si is crystallized so that the alloy is solidified. Thus, the microstructure of the matrix of this alloy comprises (Ni), the binary eutectic of (Ni)+Ni₃B, and the ternary eutectic of (Ni)+Ni₃B+Ni₃Si.

The Ni₃B is very hard (having a Vickers hardness of 1050 to 1100) and brittle, and in the binary eutectic of (Ni)+Ni₃B the brittle Ni₃B surrounds the (Ni) which is tough and ductile, so that the binary eutectic of (Ni)+Ni₃B is low in toughness and ductility and is easily cracked.

On the other hand, the ternary eutectic (Ni)+Ni₃B+Ni₃Si is more tough and ductile than the above-mentioned binary eutectic because the grain size of Ni₃B in the ternary eutectic of (Ni)+Ni₃B+Ni₃Si is very small due to its presence in the ternary eutectic and because, unlike in the binary eutectic wherein the Ni₃B completely envelops the outside of the (Ni), the Ni₃Si which is less hard (having a Vickers hardness of 800 to 850) but more tough and ductile than Ni₃B interrupts the envelope of the Ni₃B.

As is clear from the above, in the conventional self-fluxing nickel-base alloys the matrix contains the binary eutectic of (Ni)+Ni₃B which materially deteriorates the toughness and ductility of the alloys.

According to the invention, therefore, the amounts of boron and silicon to be added are so determined as to be within the area Q where the above binary eutectic of (Ni)+Ni₃B is not produced, that is, at the Si side of the line connecting the point Ni and the point Y. In other words, since at the ternary eutectic point the boron content is 2.2% by weight and the silicon content is 7.2% by weight, the toughness and ductility of the alloys have been markedly improved by rendering the weight ratio of silicon to boron (Si/B) higher than the ratio at the tertiary eutectic point, Si/B=7.2/2.2≈3.3, thereby to prevent crystallization of the binary eutectic of (Ni)+Ni₃B and instead to produce the binary eutectic of (Ni)+Ni₃Si which is more tough and ductile.

As described above, the microstructure of the matrix of the alloy system in accordance with the invention is essentially different from that of the conventional self-fluxing nickel-base alloy system and consists of (Ni), the binary eutectic of (Ni)+Ni₃Si and the ternary eutectic of (Ni)+Ni₃Si+Ni₃B.

Since the alloys of this invention contains chromium in relatively large amounts, it is necessary to study the quaternary system of Ni-Cr-B-Si or the quinary system of Ni-Cr-B-Si-C if carbon is added together with chromium. However, since there is no phase diagram of such multi-component systems, it is impossible to conduct exact analysis.

As described previously, however, a portion of the chromium is entrained in the (Ni) with the remainder thereof forming hard crystals of Cr₇C₃, CrB, etc. which form phases other than the matrix. The amount of boron in the matrix (which amount will be expressed by B(M)) decreases by the amount of boron that has been combined with chromium to form CrB (which amount will be expressed by B(Cr)), the total amount of boron in the alloy being B(Cr)+B(M). Strictly, therefore, the condition under which no binary eutectic of (Ni)+Ni₃B is crystallized in the matrix is not Si/B≧3.3 but Si/B(M)≧3.3. Since B>B(M), the lowest value of Si/B may be a little smaller than 3.3, e.g., 3.0. As previously mentioned, however, since the partition coefficients of chromium and boron to the matrix and CrB are not clear, the ratio has been determined as Si/B≧3.3 in this invention.

(c) Chromium (Cr).

The alloys of the invention contain a larger amount of chromium than the conventional self-fluxing nickel-base alloys, and this contributes to the increase in the impact and HI values. Chromium forms an intermetallic compound with boron, thereby to improve the wear resistance and corrosion resistance.

However, if the chromium content exceeds 35% by weight, much slag which is not self-fluxing is produced in the operation of forming a hard facing layer, with resulting deterioration of the weldability of the alloy, and the impact value lowers with the HI value becoming less than 45. This is undesirable.

If the chromium content is less than 7.5% by weight, the impact value decreases as the boron and silicon contents are increased within the composition range of the alloy of the invention.

With more than 7.5% by weight of chromium, the HI value exceeds 45 and becomes the greatest with 10 to 15% by weight of chromium.

With 7.5 to 15% by weight of chromium, there are produced no hard crystals which are intermetallic compounds of chromium with boron, carbon or silicon or the amount produced is markedly reduced. It was previously thought that the presence of the hard crystals in small amounts deteriorated the wear resistance of the alloys, but the results of wear tests conducted by sliding friction between test pieces of the same alloy under dry condition have disclosed that the alloys which contain 7.5 to 15% by weight of chromium have their friction coefficients markedly reduced with resulting decrease in the weight loss due to wear and improvement in the resistance to scuffing.

With less than 7.5% by weight of chromium, the weight loss due to corrosion is equivalent to or less than in the conventional self-fluxing nickel-base alloys. Therefore, such a small amount of chromium is not preferred.

(d) Carbon (C).

Carbon functions to increase the hardness of the alloys, but with less than 0.05% by weight of carbon the hardness and wear resistance are reduced. Therefore, such amounts are not preferred. With more than 1.5% by weight of carbon, the impact value becomes below 0.9 and cracks tend to occur in the hard facing layer. Therefore, such amounts are not preferred.

(e) Iron (Fe) and tungsten (W).

Iron is an element belonging to the same group as nickel in the periodic table and cheaper than it, so that as much iron as possible is preferably added. However, in order to retain the characteristics of the conventional self-fluxing nickel-base alloys as much as possible, the amount to be added preferably is less than 30% by weight. A greater amount added not only reduces the hardness and wear resistance of the alloy but also causes much slag which is not self-fluxing to be produced to remarkably reduce the workability in the operation of hard facing. Therefore, such amounts are not preferred.

Tungsten is added in order to increase the hardness and wear resistance of the alloys, especially, at high temperature. However, the impact value is reduced and the HI value becomes lower than 45. Therefore, the amount to be added is preferably less than 5% by weight.

(f) Tin (Sn) and tantalum (Ta).

Addition of either or both of tin and tantalum increases the corrosion resistance of the alloys without deteriorating the high toughness and ductility thereof as compared with those which do not contain them.

If the amount of tin added is less than 0.1% by weight, no improvement in the corrosion resistance is observed. If it is over 3% by weight, there is an appreciable effect in improving the corrosion resistance, but the impact value is greatly reduced with resulting deterioration of the hardness and ductility. Therefore, the amount of tin to be added should be less than 3% by weight.

With less than 0.1% by weight of tantalum no improvement in the corrosion resistance is observed. With 3 to 10% by weight of tantalum an increase in the corrosion resistance is observed, but there is little effect on the improvement of the corrosion resistance even when over 3% by weight is added, and it is not desirable also from the economical point of view to increase the amount of expensive tantalum to be added.

BEST EMBODIMENTS OF INVENTION

Figure 1:
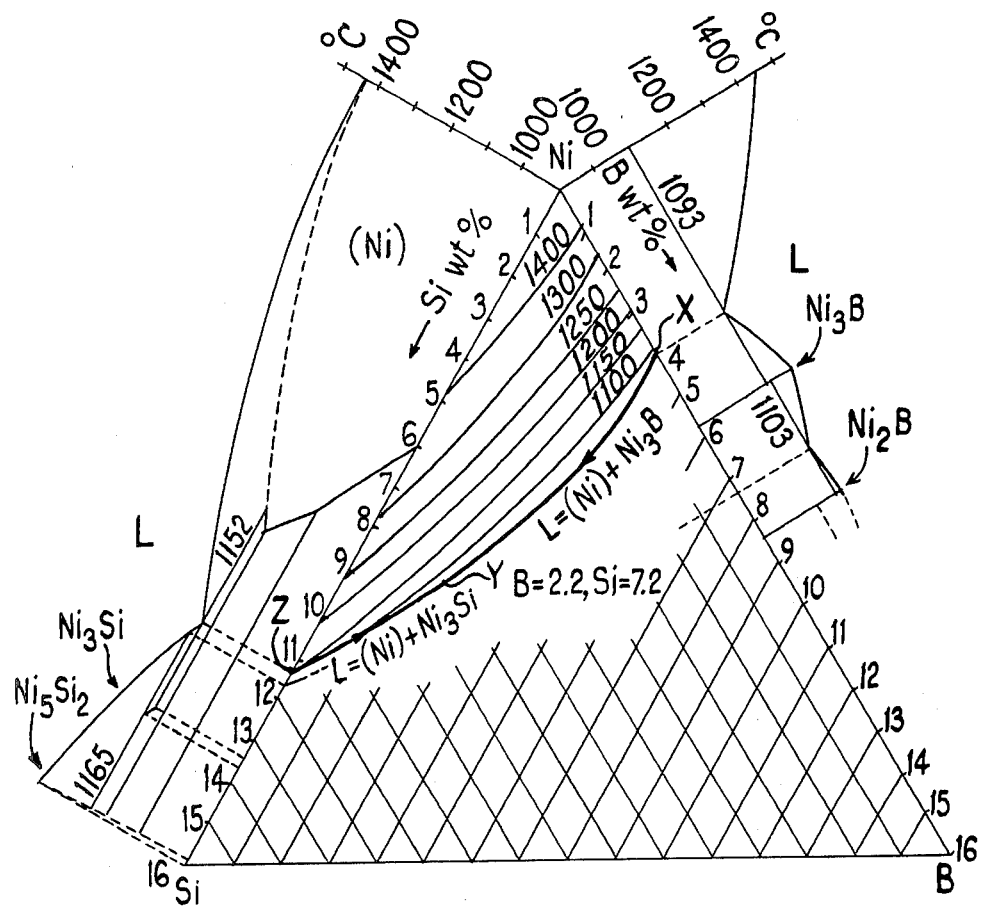
FIG. 1 is a phase diagram showing the nickel-rich region of the ternary Ni-B-Si system.
Figure 2:
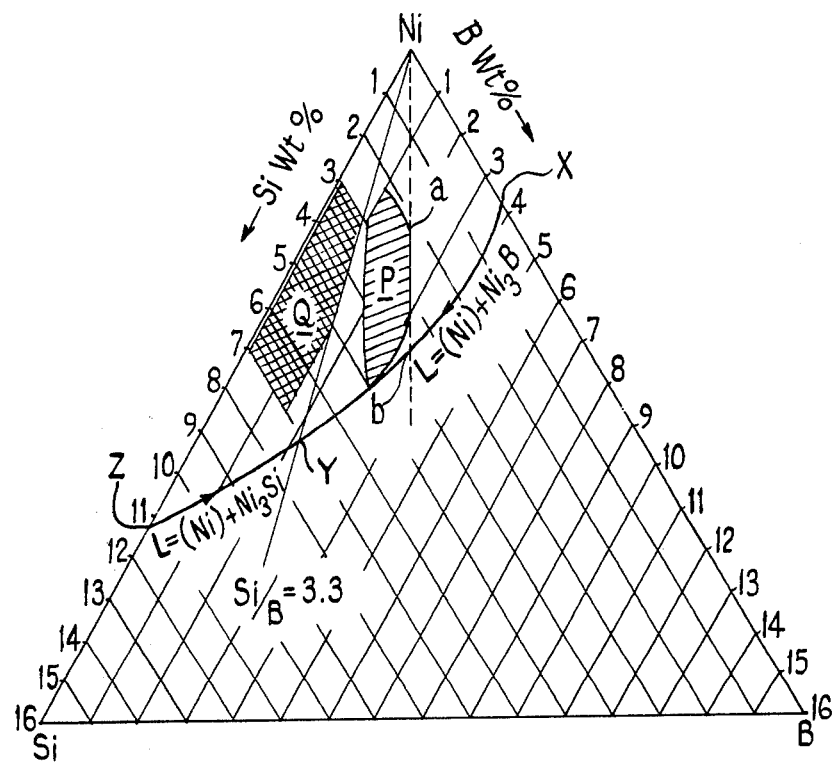
FIG. 2 is a diagram showing the conventional composition range of the same alloy system and the composition range in accordance with the invention.

Concrete embodiments of the invention will be explained below.

Table I shows the composition, hardness, impact value, HI value, presence of cracks in the deposited hard facing layer and wear resistance of eighteen alloys of the invention (Specimen Nos. 3 to 20) as compared with the conventional self-fluxing nickel-base alloys (Specimen Nos. 1 and 2).

The alloys of the invention are prepared by mixing a mother alloy with individual metals in accordance with the predetermined proportions, melting the mixture in a high frequency induction furnace and casting the melt into a shell mould to produce 5 mm welding rods and 10 mm×10 mm×55 mm specimens for impact test.

Using each of the cast 5 mm welding rods, a double hard facing layer (about 60 mm×30 mm×6 mm) is formed on a base metal (150 mm×70 mm×30 mm) of martensitic stainless steel SUS 410 by the argon gas tungsten-arc welding method, and the layer is checked for any cracks having been produced therein. Then the surface of the layer is ground flat and then tested for hardness.

The cast specimens for impact test are heat-treated at 700° C. for 5 hours for relief of stress and subjected to impact tests by using a Charpy impact testing machine (having a capacity of 15 kg-m).

The wear tests are conducted in the following manner. Using 5 mm cast welding rods of the conventional alloys and the alloys of the invention, both rotary and stationary specimens are prepared by forming a double hard facing layer (about 2 mm thick) on an end face of a cylindrical member (of carbon steel S-20C) having an outer diameter of 19.6 mm, an inner diameter of 16.0 mm and a length of 45 mm by the argon gas tungsten-arc welding method and buffing the test surface (the hard faced surface) into a mirror surface. Both of the rotary and stationary specimens are tested by contacting the surface of two specimens having a hard facing layer of the same alloy composition.

The tests are conducted with a load of 7 kg, at 100 r.p.m., a frictional distance of 340 m, without lubrication and at room temperature.

TABLE I

| Specimen No. | Composition (% by weight) | | | | | | | |
|---|---|---|---|---|---|---|---|---|
| | B | Si | Cr | C | Fe | W | Ni | Si/B |
| 1 | 1.9 | 2.8 | 10.0 | 0.4 | 2.0 | — | Bal. | 1.47 |
| 2 | 2.5 | 4.0 | 12.0 | 0.5 | 4.0 | — | " | 1.6 |
| 3 | 1.0 | 5.0 | 20 | 0.5 | — | — | " | 5.0 |
| 4 | 0.05 | " | " | " | — | — | " | 100.0 |
| 5 | 1.5 | " | " | " | — | — | " | 3.33 |
| 6 | 1.0 | 3.0 | " | " | — | — | " | 3.0 |
| 7 | " | 7.0 | " | " | — | — | " | 7.0 |
| 8 | " | 5.0 | 15 | " | — | — | " | 5.0 |
| 9 | " | " | 35 | " | — | — | " | " |
| 10 | " | " | 20 | 1.5 | — | — | " | " |
| 11 | " | " | " | 0.05 | 5.0 | — | " | " |
| 12 | " | " | " | " | 30.5 | — | " | " |
| 13 | " | " | " | " | — | 1.0 | " | " |
| 14 | " | " | " | " | — | 5.0 | " | " |
| 15 | " | 5.5 | 30 | 1.0 | 10.0 | 3.5 | " | 5.5 |
| 16 | " | " | 5 | 0.5 | 5.0 | 4.0 | " | " |
| 17 | 0.8 | " | 7.5 | " | 5.0 | 2.0 | " | 6.88 |
| 18 | 0.5 | " | 10 | 1.0 | — | 3.0 | " | 11 |
| 19 | 0.7 | 5.0 | 12.5 | 0.3 | 3.0 | 2.0 | " | 7.14 |
| 20 | " | " | 15 | 0.5 | 3.0 | 3.5 | " | " |

| Specimen No. | Hardness (H$_R$C) | Impact Value (kgm/cm$^2$) | HI Value | Crack in Hard Facing Layer | Wear Resistance | |
|---|---|---|---|---|---|---|
| | | | | | Coefficient of Friction | Weight Loss by Wear (mg) |
| 1 | 38.1 | 0.60 | 22.9 | Existing | 0.58 | 81.3 |
| 2 | 48.2 | 0.48 | 23.1 | " | 0.51 | 63.5 |
| 3 | 43.0 | 1.43 | 61.5 | Non-existing | 0.18 | 3.5 |
| 4 | 39.0 | 1.54 | 60.1 | Non-existing | — | — |
| 5 | 48.5 | 0.93 | 45.1 | Non-existing | — | — |
| 6 | 39.3 | 1.58 | 62.1 | Non-existing | — | — |
| 7 | 45.1 | 1.02 | 46.0 | Non-existing | — | — |
| 8 | 42.2 | 1.45 | 61.2 | Non-existing | — | — |
| 9 | 44.9 | 1.10 | 49.4 | Non-existing | 0.58 | 23.8 |
| 10 | 45.3 | 1.00 | 45.3 | Non-existing | — | — |
| 11 | 36.3 | 1.71 | 62.1 | Non-existing | — | — |
| 12 | 41.5 | 1.48 | 61.4 | Non-existing | — | — |
| 13 | 43.8 | 1.32 | 57.8 | Non-existing | — | — |
| 14 | 44.8 | 1.11 | 49.7 | Non-existing | — | — |
| 15 | 48.3 | 0.94 | 45.4 | Non-existing | 0.52 | 10.7 |
| 16 | 46.3 | 0.98 | 45.4 | Non-existing | 0.16 | 0.6 |
| 17 | 43.5 | 1.20 | 52.3 | Non-existing | 0.10 | 0.8 |
| 18 | 45.2 | 1.38 | 62.5 | Non-existing | 0.12 | 0.5 |
| 19 | 40.0 | 1.74 | 69.6 | Non-existing | 0.06 | 0.3 |
| 20 | 41.2 | 1.57 | 64.7 | Non-existing | 0.08 | 0.4 |

As is apparent from Table I, both the impact and HI values of the alloys of the invention are increased without any cracks occurring in the hard facing layer as compared with the conventional self-fluxing nickel-base alloys. Also those of the alloys of the invention which contain 7.5 to 15% by weight of chromium have a higher wear resistance than those which contain 15 to 30% by weight of chromium.

Table II shows the corrosion weight loss resulted from the corrosion tests conducted on the alloys of the invention containing tin and/or tantalum (Specimen Nos. 22 to 34, 36, 37, 39 and 40) and the alloys which do not contain these elements (Specimen Nos. 16 to 21, 3, 9, 35, 38) and the conventional nickel-base self-fluxing alloys (Specimen Nos. 1 and 2) in boiling aqueous solutions of 5% $H_2SO_4$, 5% HCl and 5% $HNO_3$. In Table I and II the specimens of the same number are of the same composition.

The specimens of Table II are prepared by mixing a mother alloy with individual metals in predetermined proportions and melting the mixture in a high frequency induction furnace and then casting the melt into a shell mould to produce a 100 mm × 100 m × 55 mm specimen. The cast specimens for impact test are heat-treated at 700° C. for 5 hours for relief of stress and then subjected to impact tests by a Charpy impact testing machine (having a capacity of 15 kg-m). After the impact tests the broken specimens are cut into 10 mm × 10 mm × 10 mm cubes, which are subjected to hardness and corrosion tests.

The device for conducting the corrosion tests comprises a hollow cylindrical container of glass (having an inner diameter of 70 mm and a depth of 120 mm) having a top end connected through a plug of silicone rubber to a water-cooled condenser. The container can be heated at its bottom end by an electric heater of the wire resistor type.

The test is conducted by putting a specimen on a glass plate into the hollow cylindrical glass container, into which 300 cc of a corrosion solution is introduced, and putting the silicone rubber plug therein and heating the container. The test is continued for 6 hours after the corrosion solution begins to boil.

After completion of the corrosion test the specimen is taken out and rinsed with water, after which the surface of the specimen is rubbed with a wire brush and then rinsed with water and dried and then the weight loss caused by corrosion is measured.

The corrosion weight loss is expressed as follows:

$$\frac{(\text{Weight before test}) - (\text{Weight after test})}{(\text{Surface area before test}) \times (\text{Test hour})} \text{ mg/cm}^2 \text{ hr}$$

TABLE II

| Specimen No. | B | Si | Cr | C | Fe | W | Sn | Ta | Ni | Si/B |
|---|---|---|---|---|---|---|---|---|---|---|
| 1 | 1.9 | 2.8 | 10.0 | 0.4 | 2.0 | — | — | — | Bal. | 1.47 |
| 2 | 2.5 | 4.0 | 12.5 | 0.5 | 4.0 | — | — | — | " | 1.6 |
| 16 | 1.0 | 5.5 | 5.0 | " | 5.0 | 4.0 | — | — | " | 5.5 |
| 17 | 0.8 | " | 7.5 | " | " | 2.0 | — | — | " | 6.88 |
| 18 | 0.5 | " | 10.0 | 1.0 | — | 3.0 | — | — | " | 10.0 |
| 19 | 0.7 | 5.0 | 12.5 | 0.3 | 3.0 | 2.0 | — | — | " | 7.14 |
| 20 | " | " | 15.0 | 0.6 | 5.0 | " | — | — | " | " |
| 21 | " | " | 17.5 | " | " | " | — | — | " | " |
| 3 | 1.0 | " | 20.0 | 0.5 | 2.0 | — | — | — | " | 5.0 |
| 9 | " | " | 35.0 | " | — | — | — | — | " | " |
| 22 | 0.7 | " | 15.0 | 0.6 | 5.0 | 2.0 | 0.1 | — | " | 7.14 |
| 23 | " | " | " | " | " | " | 0.5 | — | " | " |
| 24 | " | " | " | " | " | " | 1.0 | — | " | " |
| 25 | " | " | " | " | " | " | 3.0 | — | " | " |
| 26 | " | " | " | " | " | " | — | 0.1 | " | " |
| 27 | " | " | " | " | " | " | — | 0.5 | " | " |
| 28 | " | " | " | " | " | " | — | 1.0 | " | " |
| 29 | " | " | " | " | " | " | — | 3.0 | " | " |
| 30 | " | " | " | " | " | " | 0.1 | 0.5 | " | " |
| 31 | " | " | " | " | " | " | 0.5 | " | " | " |
| 32 | " | " | " | " | " | " | " | 1.0 | " | " |
| 33 | " | " | " | " | " | " | 1.0 | " | " | " |
| 34 | " | " | " | " | " | " | 2.0 | 2.0 | " | " |
| 35 | " | 3.5 | 12.1 | 1.2 | " | " | — | — | " | 5.0 |
| 36 | " | " | " | " | " | " | 1.0 | — | " | " |
| 37 | " | " | " | " | " | " | — | 1.0 | " | " |
| 38 | 0.5 | 6.5 | 16.0 | 0.2 | " | " | — | — | " | 13.0 |
| 39 | " | " | " | " | " | " | 1.0 | — | " | " |
| 40 | " | " | " | " | " | " | — | 1.0 | " | " |

| Specimen No. | Hardness ($H_RC$) | Impact Value (kgm/cm²) | HI Value | Crack in Hard Facing Layer | Weight Loss by Corrosion (mg/cm² hr) 5% $H_2SO_4$ | 5% HCl | 5% $HNO_3$ |
|---|---|---|---|---|---|---|---|
| 1 | 38.1 | 0.60 | 22.9 | Existing | 28.50 | 88.30 | 67.20 |
| 2 | 48.2 | 0.48 | 23.1 | Existing | 31.45 | 103.10 | 72.80 |
| 16 | 46.3 | 0.98 | 45.4 | Non-existing | 37.30 | 67.16 | 106.10 |
| 17 | 43.5 | 1.20 | 52.3 | Non-existing | 25.77 | 18.30 | 61.51 |
| 18 | 45.2 | 1.38 | 62.5 | Non-existing | 24.47 | 15.22 | 55.11 |
| 19 | 40.0 | 1.74 | 69.6 | Non-existing | 21.19 | 17.54 | 48.15 |
| 20 | 41.2 | 1.57 | 64.7 | Non-existing | 19.91 | 19.33 | 31.07 |
| 21 | 43.4 | 1.22 | 53.0 | Non-existing | 10.05 | 10.02 | 7.28 |
| 3 | 43.0 | 1.43 | 61.5 | Non-existing | 9.34 | 17.06 | 8.66 |
| 9 | 44.9 | 1.10 | 49.4 | Non-existing | 9.35 | 14.49 | 1.01 |
| 22 | 44.0 | 1.20 | 52.8 | Non-existing | 10.05 | 12.84 | 17.06 |
| 23 | 44.6 | 1.15 | 51.2 | Non-existing | 3.89 | 6.02 | 7.28 |
| 24 | 47.5 | 1.08 | 51.2 | Non-existing | 1.56 | 4.21 | 2.49 |
| 25 | 52.1 | 0.90 | 46.8 | Non-existing | 0.50 | 2.49 | 1.27 |
| 26 | 43.8 | 1.22 | 53.4 | Non-existing | 15.90 | 16.97 | 24.01 |
| 27 | 44.5 | 1.34 | 59.7 | Non-existing | 9.52 | 11.61 | 11.83 |
| 28 | 44.8 | 1.40 | 62.8 | Non-existing | 6.76 | 8.65 | 6.80 |
| 29 | 42.5 | 1.34 | 57.0 | Non-existing | 3.46 | 4.42 | 1.85 |
| 30 | 44.0 | 1.27 | 55.9 | Non-existing | 6.68 | 10.35 | 9.45 |
| 31 | 45.0 | 1.10 | 49.5 | Non-existing | 2.28 | 4.85 | 4.03 |
| 32 | 44.6 | 1.29 | 57.5 | Non-existing | 1.61 | 3.61 | 2.32 |
| 33 | 46.5 | 1.05 | 48.8 | Non-existing | 0.65 | 2.53 | 1.59 |
| 34 | 44.6 | 1.09 | 48.6 | Non-existing | 1.10 | 2.47 | 1.24 |
| 35 | 35.5 | 1.34 | 47.6 | Non-existing | 19.73 | 16.54 | 57.11 |
| 36 | 43.8 | 1.03 | 45.1 | Non-existing | 5.96 | 3.57 | 44.44 |
| 37 | 36.0 | 1.35 | 48.6 | Non-existing | 9.91 | 11.36 | 36.70 |
| 38 | 41.0 | 1.10 | 45.1 | Non-existing | 7.44 | 10.39 | 13.61 |
| 39 | 48.0 | 0.95 | 45.6 | Non-existing | 0.90 | 3.73 | 1.80 |
| 40 | 47.4 | 1.05 | 50.0 | Non-existing | 4.01 | 6.69 | 2.30 |

As is apparent from Table II, the alloys of the invention which contain tin and/or tantalum are superior to the conventional alloys with respect to hardness, the impact value, the HI value, and corrosion resistance, with no cracks or fissures occurring in the hard facing layer, and also markedly improved in corrosion resistance without reduction of the hardness, the impact value and HI value, as compared with the alloys of the invention which do not contain tin or tantalum. If the amount of chromium added is reduced below 7.5%, the corrosion resistance becomes lower than if the amount is greater than it.

Addition of tin and tantalum has a secondary advantage that blow is prevented in the operation of hard facing by means of gas welding.

Figure 3:
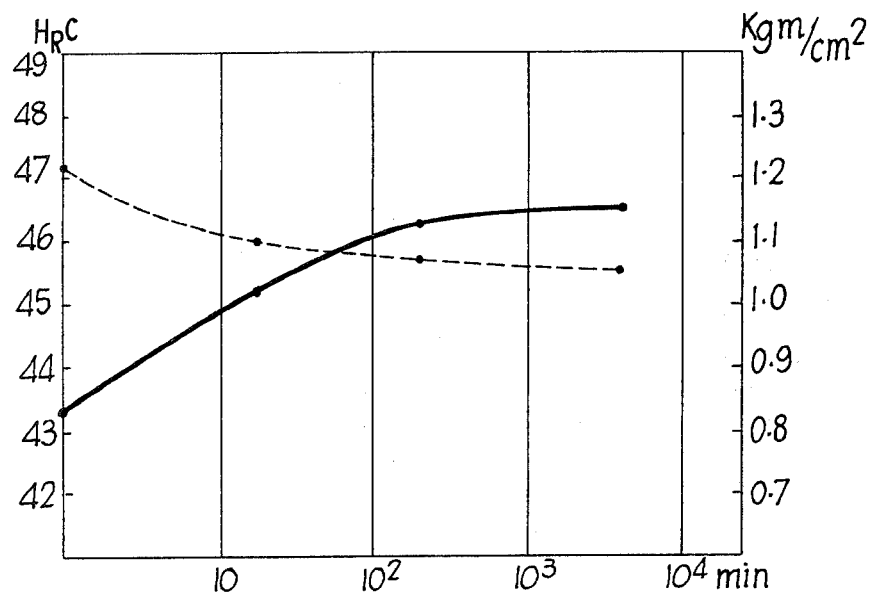
FIG. 3 is a graph showing the changes caused by heat treatment in the hardness and impact value of the hard facing nickel-base alloy system of the invention.

Furthermore, by treating the alloys of this invention at 600° C. it is possible to increase the hardness as shown in FIG. 3 without materially reducing the impact value. In FIG. 3, the real line curve indicates the hardness and the dotted line curve the impact value. The specimens used are of the same composition as that of No. 21 in the above table.

Possible Industrial Applications

It is obvious from the above that the self-fluxing nickel-base alloy of the invention has high impact and HI values with no cracks produced in the hard facing layer, that is, not only highly tough and ductile but also superior in wear resistance and corrosion resistance, and obviously has good heat resistance in view of the alloy composition, so that the alloys of the invention can very effectively be used for hard facing for prevention of wear, corrosion, oxidation at high temperature, errosion, etc. in various plants, machines, tools, etc.

The alloys of the invention can be applied for hard facing by various methods, such as conventional gas welding, TIG welding, etc., and when they are used in the form of powder, plasma flame spraying, gas flame spraying, etc. may also be employed.

We claim:

1. A hard-facing nickel-base alloy having an impact value of more than 0.9 kgm/cm$^2$ and a hardness times impact value of greater than 45, said alloy consisting essentially of 0.05 to 1.5% by weight boron, 3 to 7% by weight silicon, 7.5 to 35% by weight chromium, 0.05 to 1.5% by weight carbon, the balance being substantially nickel and the weight ratio of silicon to boron (Si/B) being more than 3.3 to avoid the formation of the binary eutectic Ni+Ni$_3$B.

2. The hard facing nickel-base alloy described in claim 1 and characterized by further containing less than 30% by weight of iron.

3. The hard facing nickel-base alloy described in claim 1 and characterized by further containing less than 5% by weight of tungsten.

4. The hard facing nickel-base alloy described in claim 1 and characterized by further containing less than 30% by weight of iron and less 5% by weight of tungsten.

5. The hard facing nickel-base alloy described in anyone of claims 1, 2, 3 and 4 and characterized by further containing 0.1 to 3% by weight of tin.

6. The hard facing nickel-base alloy described in anyone of claims 1, 2, 3 and 4 and characterized by further containing 0.1 to 3% by weight of tantalum.

7. The hard facing nickel-base alloy described in anyone or claims 1, 2, 3 and 4 and characterized by further containing 0.1 to 3% by weight of tin and 0.1 to 3% by weight of tantalum.

* * * * *